United States Patent [19]

Meyer

[11] Patent Number: 5,102,307
[45] Date of Patent: Apr. 7, 1992

[54] ELECTRIC FUEL PUMP WITH RADIO FREQUENCY NOISE SUPRESSION

[75] Inventor: Paul M. Meyer, Godrey, Ill.

[73] Assignee: Carter Automotive Company, Inc., St. Louis, Mo.

[21] Appl. No.: 577,237

[22] Filed: Sep. 4, 1990

[51] Int. Cl.⁵ .......................... H02K 5/24; F04B 35/04
[52] U.S. Cl. ................... 417/423.7; 417/410; 310/71; 310/72
[58] Field of Search ................ 417/313, 423.7, 423.3, 417/410, 366, 369; 310/68 R, 89, 51, 71, 72

[56] References Cited

U.S. PATENT DOCUMENTS

| | | | |
|---|---|---|---|
| 4,329,605 | 5/1982 | Angi et al. ............... | 310/72 |
| 4,342,934 | 8/1982 | Van Wijhe et al. ......... | 310/72 |
| 4,384,223 | 5/1983 | Zelt ..................... | 310/72 |
| 4,429,241 | 1/1984 | Ohara et al. .............. | 310/51 |
| 4,748,356 | 5/1988 | Okashiro et al. ........... | 310/72 |
| 4,845,393 | 7/1989 | Burgess et al. ............ | 417/410 |

Primary Examiner—Richard A. Bertsch
Assistant Examiner—David L. Cavanaugh
Attorney, Agent, or Firm—Lawrence J. Shurupoff

[57] ABSTRACT

A motor-operated pump includes an electrical filter that includes an inductance and a capacitance mounted within the pump housing. The filter components are thereby shielded against possible damage during initial installation, or during shipment, or during maintenance operations. Electrically, the filter components are in direct connection with the motor terminals, so as to have maximum electrical effectiveness for suppression of radio frequency emissions that might otherwise be communicated to other on-board electrical components.

15 Claims, 2 Drawing Sheets

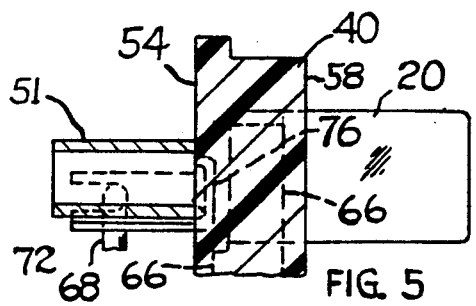
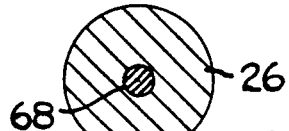
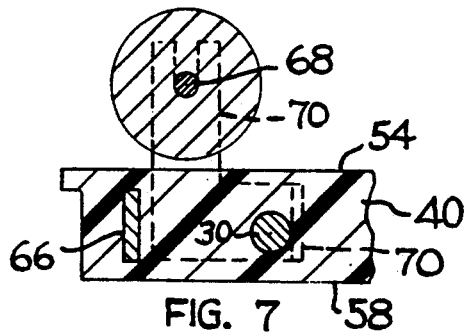
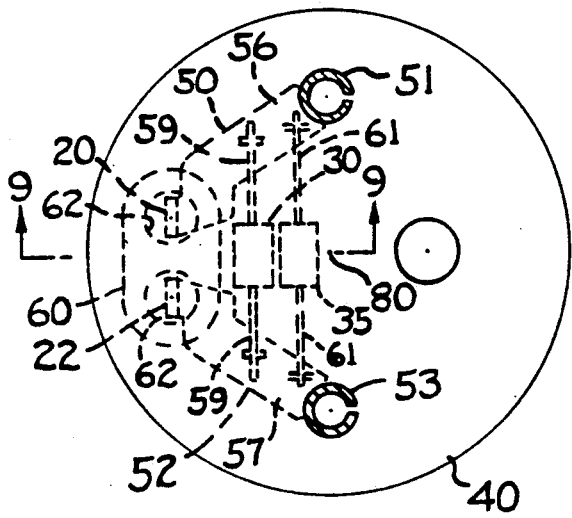
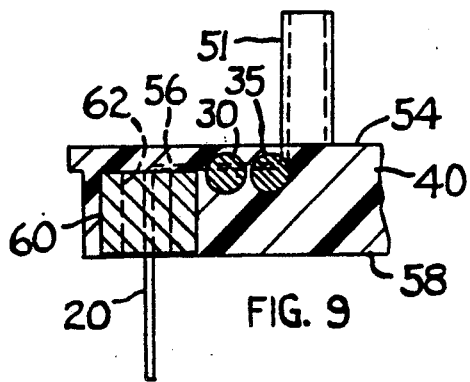

ELECTRIC FUEL PUMP WITH RADIO FREQUENCY NOISE SUPRESSION

BACKGROUND OF THE INVENTION

1. Field of the Invention

This invention relates to motor-operated fuel pumps adapted for use in automobiles, trucks and the like and particularly relates to the incorporation of an electrical filter into the pump motor electric circuit to eliminate or minimize radio frequency interferences that can otherwise be generated while the fuel pump motor is in operation.

2. Description of Prior Developments

Fuel pump motors sometimes produce undesired frequency signals that can interfere with the operation of radios and computers on board a vehicle. The undesired signals can be due to small electrical arcs associated with movements of the motor brushes across the commutators. As the brush approaches or recedes from a commutator surface the electrical voltage tends to leap across the brush-commutator space to generate an electrical arc. There is thus superimposed on the steady state current a series of electrical spikes or surges related to the motor-operating frequency. The superimposed high frequency signal can interfere with other equipment on board the vehicle, especially radios and computers.

It is known that a high frequency signal can be eliminated or minimized by use of a filter circuit which includes a capacitance and an inductance. The filter is designed to offer a high impedance to the undesired frequency while offering minimal impedance to the steady state low frequency signal. The inductance provides the high impedance, and the capacitor shunts the high frequency signal to ground. Applicable filter circuits are mentioned in U.S. Pat. No. 2,308,013 to Lee, U.S. Pat. No. 4,079,435 to Brown, U.S. Pat. No. 4,080,552 to Brown, and U.S. Pat. No. 4,554,608 to Block.

SUMMARY OF THE INVENTION

The present invention relates to a packaging design for a radio frequency filter which includes a capacitor and an inductance as an integral part of a terminal board used to supply current to a fuel pump motor. A principal aim of the invention is to incorporate the filter components into an existing fuel pump without modifying the pump housing and without adding appreciable cost to the pump.

Another object is to incorporate the electrical filter components within the pump housing, as opposed to placement of the filtering components on the outside of the housing. With such an arrangement, the electrical components are shielded from possible damage or abuse during shipment or while the fuel pump is being installed in the vehicle, i.e. within a fuel tank or fuel supply module.

BRIEF DESCRIPTION OF THE DRAWINGS

Various other objects, features and attendent advantages of the present invention will be more fully appreciated from the following detailed description when considered in connection with the accompanying drawings, in which the same reference numbers designate the same or corresponding parts throughout.

FIG. 5 is a fragmentary sectional view taken on line 5-5 in FIG. 4.

FIG. 6 is a fragmentary sectional view taken on line 6-6 in FIG. 4.

FIG. 7 is a fragmentary sectional view taken on line 7-7 in FIG. 4.

FIG. 8 is a view taken in the same direction as FIG. 4, but illustrating another filter circuit incorporating the invention.

FIG. 9 is a fragmentary sectional view taken on line 9-9 in FIG. 8.

DESCRIPTION OF THE PREFERRED EMBODIMENT

Figure 1:
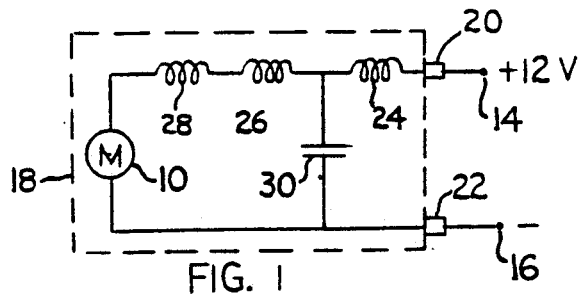
FIGS. 1 and 2 show electrical filtering circuits that can be used in practicing the invention.

The electro-magnetic interference (EMI) filtering circuit shown diagrammatically in FIG. 1 includes a D.C. motor 10 having electrical connections to a voltage source 14 and ground 16. Dashed line 18 represents the housing of a pump that is driven by the motor which is located within the pump housing. The pump housing has two external electrical spade connections 20 and 22 connectable respectively to the voltage source and ground.

Located within the pump housing is a filtering circuit which includes three inductances 24, 26 and 28, and a capacitor 30. The inductances are connected in series between spade connection 20 and the positive terminal on the motor. The capacitor is connected in parallel with the motor across the two connections 20 and 22.

Figure 3:
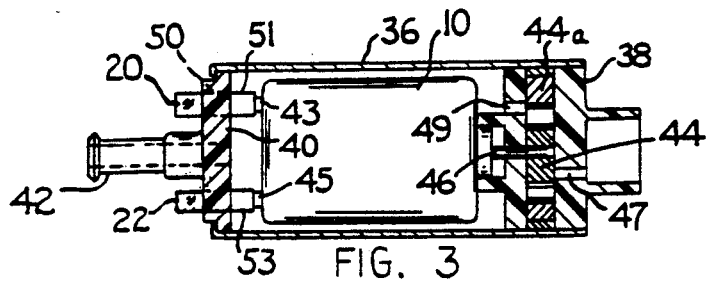
FIG. 3 is a sectional view taken through a fuel pump in which the invention can be practiced.

FIG. 3 shows a pump-motor assembly that can utilize the filtering circuit of FIG. 1 therein. FIGS. 4 through 7 illustrate a desired placement of the filtering circuit components on a dielectric end plate of the FIG. 3 pump housing.

Figure 2:
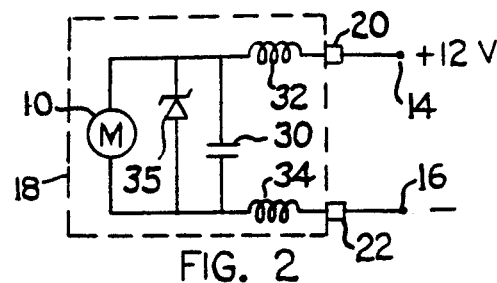

FIG. 2 diammetrically illustrates another EMI filtering circuit arrangement which includes two inductances 32, 34 and a shunt capacitance 30 that can be employed in practicing the invention. An optional EMI suppression diode may be added as a second shunt element in the form of Zener diode 35. Diode 35 clips low frequency electrical spikes which are generated when the pump motor 10 is turned on and off such as by a relay. Such spikes can also be caused by loose wiring connections. The filtering system is located within the pump housing 18, similarly to the FIG. 1 arrangement.

In the FIG. 2 arrangement one inductance 32 is located between spade connection 20 and the positive terminal of the motor. The other inductance 34 is located between the negative terminal of the motor and spade connection 22. FIGS. 8 and 9 show a physical placement of the FIG. 2 filtering components on the dielectric end plate of the FIG. 3 pump housing.

The pump-motor assembly may be a generally conventional structure such as that manufactured and marketed by Carter Automotive Company of St. Louis, Mo. under the tradename CARotor. The pump portion of the assembly includes a cylindrical housing element 36 (FIG. 3) extending between two end plates 38 and 40. A small D.C. motor 10 is located within the pump housing to provide operating power for a liquid pumping gear 44, via a motor shaft 46. Gear 44 meshes with one or more eccentric gears 44a to transport liquid fuel such as gasoline from an inlet opening 47 leftwardly through an opening 49. The pumped liquid flows around and along motor 10 and into a confined space between the left end of motor 10 and housing end plate 40. The liquid exits from the pump through a spigot 42 formed as an integral part of end plate 40.

End plate 40 is formed of a dielectric material, such that it can serve as a terminal board for conducting current to or from pin-type terminals 43 and 45 that extend leftwardly from motor 10. Electrical connectors 50 and 52 extend through dielectric end plate 40 for connecting the motor terminals to voltage source 14 and ground 16 (FIGS. 1 and 2). These electrical connectors 50 and 52 include internal sleeve sections 51 and 53 adapted to slidably telescope onto and securely receive motor terminals 43 and 45. Connectors 50 and 52 further include external spade sections 20 and 22 adapted to receive slip-on electrical clips associated with the external lead wiring schematically depicted in FIGS. 1 and 2.

Electrical connectors 50 and 52 establish electrical connections to motor terminals 43 and 45 when dielectric end plate 40 is installed onto housing element 36. Housing elements 40, 36 and 38 collectively form the pump housing 18 of FIGS. 1 and 2.

FIGS. 8 and 9 show a system of filtering components mounted on and within end plate 40 according to one form of the invention. FIG. 8 is taken in a direction looking from motor 10 toward the internal (right) face of dielectric end plate 40 as represented in FIG. 3. Electrical connector 50 includes a sleeve portion 51 extending normal to internal face 54 of plate 40, a plate portion 56 extending within dielectric plate 40 at right angles to sleeve portion 51, and a spade portion 20 extending from plate portion 56 through the external face 58 of plate 40.

A capacitor 30 is encapsulated within dielectric end plate 40 in the space between electrical connectors 50 and 52. Connector 52 is constructed similarly to connector 50 except that it is a mirror image of that connector. Lead wires 59 extend from capacitor 30 for attachment to plate portions 56 and 57 of the two connectors.

Still referring to FIGS. 8 and 9, there is shown a zener diode 35 having lead wires 61 attached to plate portions 56 and 57 of electrical connectors 50 and 52. The pump housing end plate 40 serves to encapsulate capacitor 30 and zener diode 35, as well as plate portions 56 and 57 of the two electrical connectors.

A block 60 of ferrite material serves as the two inductances 32 and 34 in the FIG. 8 assembly. Cylindrical holes 62 are formed in block 60 to receive therethrough the encapsulated sections of spade portions 20 and 22. Electrically the system corresponds to the system shown in FIG. 2. The filtering elements 60 and 30 are located within the pump housing 18 when end plate 40 is assembled onto housing element 36 (FIG. 3). Therefore, the filtering elements are protected from physical damage or abuse.

As a slight variant of the arrangement shown in FIGS. 8 and 9, the inductances 32 and 34 may be formed by incorporating ferrite (in particulate form) into the molding composition used to form dielectric end plate 40. The ferrite material will then be distributed throughout the end plate wall structure rather than being a discrete block 60.

FIGS. 4 through 7 illustrate a structural arrangement that can be used to form the electrical filtering system shown diagrammatically in FIG. 1. In the FIG. 4 construction, the spade connection 20 (FIG. 5) is an integral part of an arcuate conductive strip 66 that extends within and along end plate 40. An end portion of strip 66 is turned to extend through the internal face 54 of plate 40, thereby forming a mounting device 67 for one end of an arcuate segmental conductor (wire) 68.

The segmental conductor 68 extends from mounting device 67 through the exposed portion of a plate element 70. The general outline of plate element 70 is shown in FIG. 7. As will be seen from FIG. 7, the exposed portion of plate element 70 has a slot therein adapted to seat and partially encircle wire conductor 68. The exposed end portion 67 of strip 66 has a similarly configured slot therein.

Wire conductor 68 extends through holes in three ferrite blocks 24, 26 and 28 that constitute the inductances shown in FIG. 1. An end portion of conductor 68 is seated in a slot in an exposed portion 72 of a conductive member 74. Member 74 includes an embedded portion 76 and an exposed sleeve portion 51. The sleeve portion is adapted to telescope onto a pin type terminal 43 of motor 10, as shown in FIG. 3.

Figure 4:
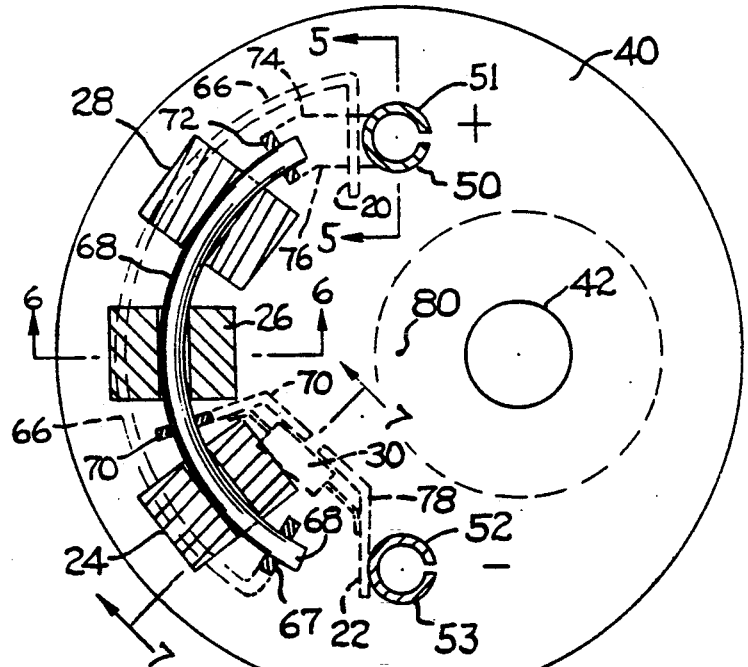
FIG. 4 is an enlarged view of a pump housing end plate having a filter circuit incorporated thereon in accordance with the invention.

As best appreciated from a review of FIGS. 4 and 5, the conductive path from spade portion 20 to sleeve portion 51 includes embedded strip 66, wire conductor 68, and conductive member 74. Inductances in the form of ferrite blocks 24, 26 and 28 are carried on end plate 40 in surrounding proximity to conductor 68. The three components 66, 68 and 74 collectively correspond to electrical connector 50 referenced in FIG. 3.

The other connector 52 is formed by a single conductive element that includes a spade portion 22 extending outwardly through face 58 of dielectric end plate 40, sleeve portion 53 extending outwardly through face 54 of end plate 40, and a plate element 78 embedded within dielectric plate 40 in the general vicinity of plate element 70.

Capacitor 30 is embedded and encapsulated within end plate 40 with its wire leads soldered or otherwise attached to plate elements 70 and 78, as shown generally in FIG. 4. Plate element 70 is attached to the positive connector 50 by reason of its attachment to wire conductor 68. Plate element 78 forms part of the negative connector 52. By connecting the capacitor to these plate elements the capacitor is in electrical parallelism with motor 10, as shown in FIG. 1.

The filter system of FIGS. 4 through 7 is similar to the FIG. 8 system in that when end plate 40 is installed onto the pump housing sleeve 36, the filtering components 24, 26, 28 and 30 are enclosed within the housing structure, and are thus protected against inadvertent damage or abuse. Also the filtering components are in direct electrical connection with motor terminals 43 and 45, so as to have an effective electrical filter action.

With both filter systems the sleeve portions 51 and 53 of the electrical connectors are oriented on an imaginary diammetrical line passing through the central axis 80 of dielectric end plate 40. As seen in FIGS. 4 and 8, the filter components are located between sleeve portions 51 and 53, but offset to the left of central axis 80 across from the space occupied by the spigot 42. The electrical components are thus out of the liquid flow path generated by the spigot 42 location.

The packaging of the filter components shown in FIGS. 4 through 9 is intended for use with a conventional pump housing configuration, with minimum modification or reconstruction expense. The mold and tooling for end plate 40 can be retained and the filtering components and associated connectors 50 and 52 can be incorporated as inserts in the mold cavity.

A principal advantage of this invention is the fact that the electrical filter can be incorporated into a fuel pump housing at relatively small added expense. The filter components are located in shielded positions within the pump housing, rather than being located as external add-on components.

What is claimed is:

1. A motor-operated pump comprising a D.C. electric motor having a positive terminal and a negative terminal;
   a pump housing that includes an end plate located in near adjacency to the motor terminals;
   first electrical conductor means extending through the end plate to connect the positive terminal to a D.C. voltage source;
   second electrical conductor means extending through said end plate to connect the negative terminal to ground;
   an electrical inductance means supported by said end plate, said inductance means comprising a ferrite block having a hole therethrough, said first conductor means extending through said hole; and
   a capacitor connected across said first and second conductor means in electrical parallelism with the motor.

2. A motor-operated pump comprising a D.C. electric motor having a positive terminal and a negative terminal;
   a pump housing that includes a dielectric end plate located in near adjacency to the motor terminals, said plate having an internal face presented to the terminals and an external face located away from the terminals;
   a first electrical lead extending through the end plate to connect the positive terminal to a D.C. voltage source;
   a second electrical lead extending through said end plate to connect the negative terminal ground;
   an electrical inductance means supported on said end plate in near proximity to said first lead, said inductance means comprising a ferrite block having a hole therethrough, said first lead extending through said hole;
   a capacitor connected across the two leads in electrical parallelism with the motor; and
   said motor terminals comprising a pair of electrical connectors and wherein each of said electrical leads has a portion adapted to respectively mate with one of said electrical leads.

3. The pump of claim 1, wherein said capacitor is encapsulated within the dielectric end plate.

4. The pump of claim 1, wherein said ferrite block is encapsulated within the dielectric end plate.

5. The pump of claim 1, wherein each lead has a slide-on connection with the associated motor terminal.

6. The pump of claim 1, wherein each motor terminal is an electrical pin, and each lead has a sleeve portion adapted to telescope onto the associated pin.

7. The pump of claim 1, wherein each lead comprises a sleeve portion extending normal to the internal face of the end plate, a plate portion extending at right angles to the sleeve portion within the end plate, and a spade portion extending from the plate portion through the external face of the end plate.

8. The pump of claim 7, wherein said capacitor is encapsulated within the dielectric end plate.

9. The pump of claim 8, wherein said ferrite block is encapsulated within the dielectric end plate.

10. The pump of claim 2, further comprising a diode connected across the two connectors in electrical parallelism with the motor.

11. The pump of claim 2, wherein each electrical lead comprises a sleeve portion extending normal to the internal face of the dielectric end plate and a spade portion extending normal to the external face of the end plate.

12. The pump of claim 11, wherein the sleeve portions of the two leads are oriented on a line passing through the central axis of the plate, said inductance means and said capacitor being located generally between the two sleeve portions but offset toward one edge of the end plate.

13. The pump of claim 11, wherein said first lead includes an arcuate segmental conductor extending along the internal face of the end plate; said inductance means comprising a plural number of ferrite blocks having holes extending therethrough, said arcuate segmental conductor extending through the holes in said blocks.

14. The pump of claim 13, wherein said arcuate segmental conductor has its arc centered on the central axis of the dielectric end plate.

15. The pump of claim 13, wherein said first lead includes a first plate element extending from the segmental conductor into the dielectric end plate; said second lead comprising a second plate element located within the dielectric end plate in the general vicinity of the first plate element; and said capacitor being encapsulated within the dielectric end plate.

* * * * *